Oct. 24, 1933.  E. A. WHITE  1,931,565
FRUIT TREATING MECHANISM
Filed May 15, 1929   2 Sheets-Sheet 2
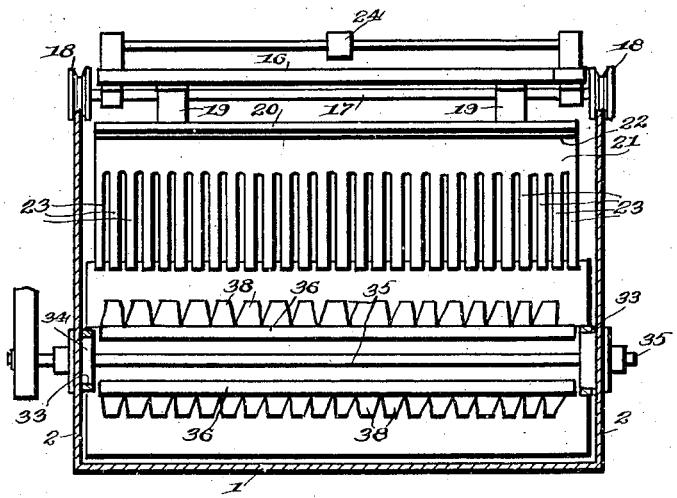
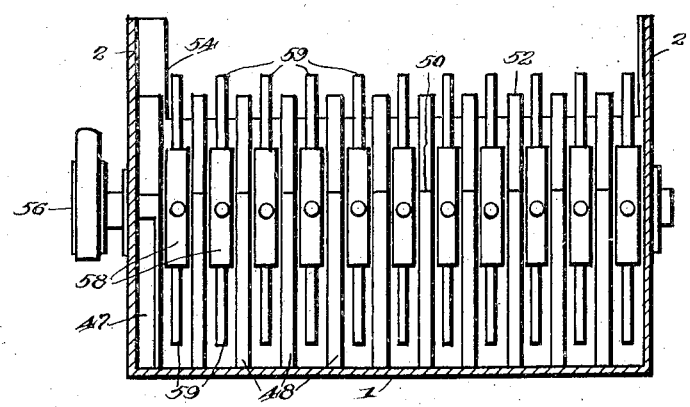
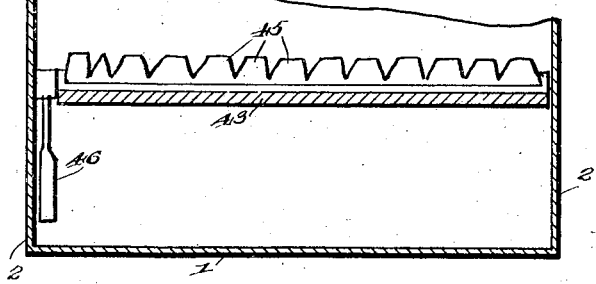
INVENTOR
Edward A. White
BY
Carl H. Crawford
ATTORNEY Patented Oct. 24, 1933

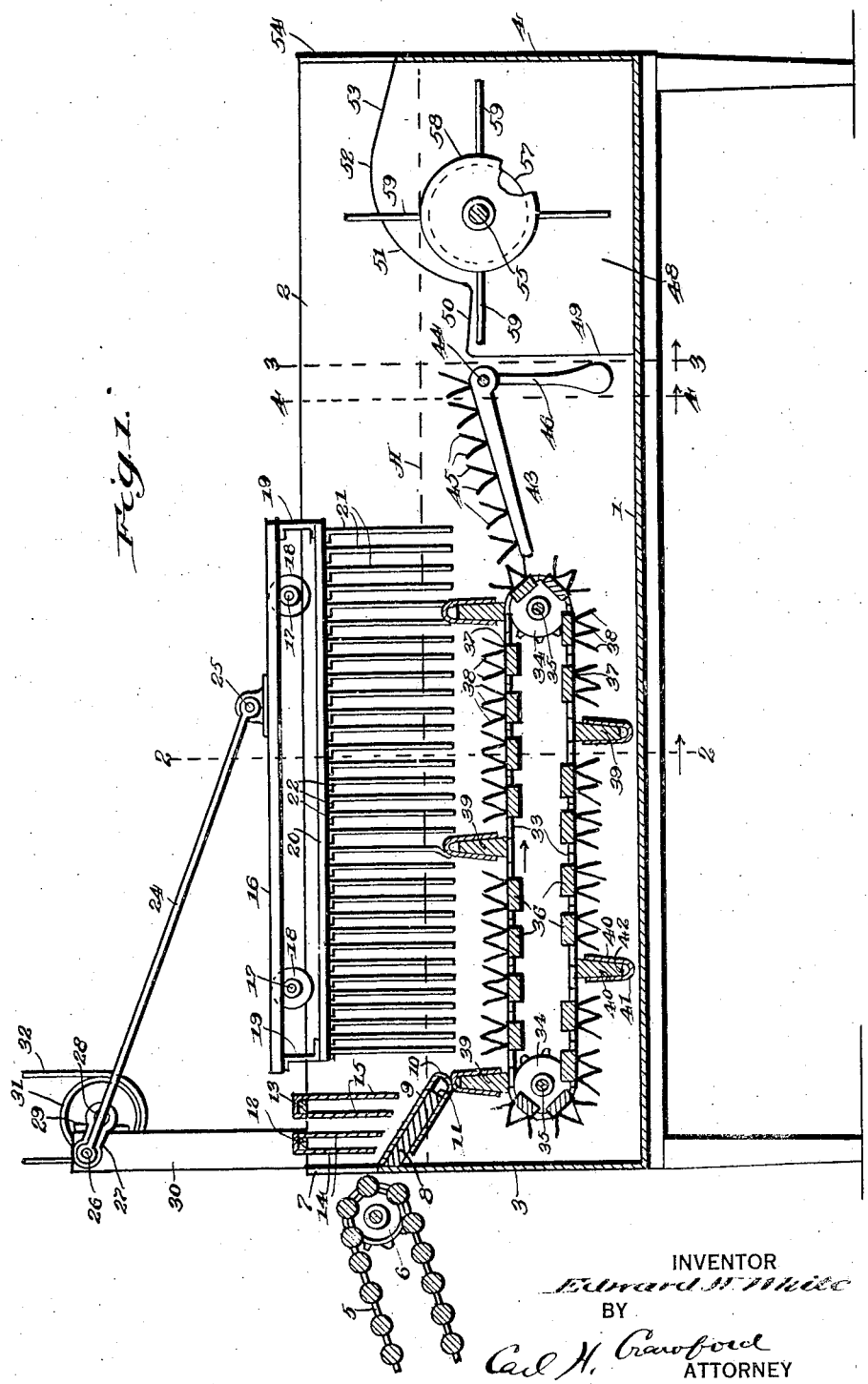

1,931,565

UNITED STATES PATENT OFFICE 1,931,565

FRUIT TREATING MECHANISM

Edward A. White, Lewiston, Idaho

Application May 15, 1929. Serial No. 363,135

6 Claims. (Cl. 146—194)

The object of this invention is to provide an improved method and mechanism for removing foreign matter from whole edibles.

It is a feature of the invention to remove poison spray sediment from fruit, and in this phase of the invention a relatively weak solution is employed that is a solvent for the poison, while in that phase of the invention addressed for instance to removal of soil from potatoes, topped beets or the like, only water need be employed.

In the employment of either use of the invention, it is a feature to apply a wiping action on the edible, of whatever nature is being operated upon, to wipe off the foreign matter after the latter has been softened by immersion in the liquid.

It is also a feature of the invention to act upon the edible while the latter is individually and floatingly free to move about in the liquid whereby the wiping action will cause the floating edible to spin and turn in many directions.

A special feature relating to the removal of spray sediment from fruit such as apples, which are fully buoyant, is to permit the latter to seek the surface and periodically expose portions of their areas to the outer air thereby eliminating the danger of hydrostatic pressure causing penetration of the acid solution into the cores of the apples thereby breaking down the structure thereof.

A further feature consists in relatively slowly advancing the edibles through the liquid and simultaneously exposing the floating or semi-buoyant edibles to not only an opposition wiping action, but to a wiping action of a reverse character.

A further feature consists in subjecting the advancing edibles to wiping action above and below the same for more effective engagement with the foreign matter thereon as a result of the spinning and turning of the edibles while the latter are advancing, this feature also enabling me to treat either fully or semi-buoyant edibles with equal facility and effectiveness.

The invention has many other features and objects which will be more fully described in connection with the accompanying drawings and which will be more particularly pointed out in and by the appended claims.

In the drawings:—

Fig. 1 is a longitudinal vertical sectional view of the most improved form of the device of my invention.

Fig. 2 is a vertical sectional view on line 2—2 of Fig. 1, looking to the right of the latter.

Fig. 3 is a vertical sectional view on line 3—3 of Fig. 1, looking toward the right of the latter.

Fig. 4 is a sectional view on line 4—4 of Fig. 1, looking toward the right of the latter.

Like characters of reference designate similar parts throughout the different figures of the drawings.

As shown, the invention includes a tank having a bottom wall 1, side walls 2, an end wall 3 and an end wall 4. This tank is adapted to contain water or a weak solution with the level disposed at approximately the dotted line A.

A delivery means may be in the form of an endless conveyor 5 trained about one set of wheels 6 to dispose the bight of the conveyor in a position to discharge through an opening 7, in the wall 3, of the tank. This conveyor will preferably be of a width sufficient to deliver rows of edibles into the tank approximately equal in length to the interior width of said tank and the conveyor will also be driven in timed relation with tank mechanism to be later described. Thus, in the preferred method, the edibles will be delivered in rows, one after the other, the significance of which will presently appear.

As the edibles are delivered above the liquid level A, I prefer to employ an incline 8 which forms a runway extending from above, to a suitable depth below the liquid level, to facilitate an easy entrance of the edibles into the liquid. I advisedly cover the incline 8, with rubber or like material not affected by the acid solution used, as indicated at 9, on both the upper and lower faces, the bight 10, of said covering extending beyond the end 11 of said incline, thereby forming a yielding or collapsible terminal edge, the function of which will presently be described.

To retard the rows of edible integers down the incline 8, against a too rapid descent, I suspend at 12 and 13, double curtains 14 and 15 against which the integers must roll, as will now be clear.

I will next describe one of my improved edible wiping devices.

A carriage frame 16 is suitably mounted or journalled on shafts 17 on which grooved wheels 18 are fixed. Said wheels 18 may run on specially provided tracks, or as shown, they may run on the top edges of walls 2, of the tank. From this carriage frame is hung by pendent hangers 19, a wiper platform 20, which is substantially coextensive in length and width with the carriage frame 16. To the lower face of platform 20, is fixed a series of aprons 21, the upper edges of which may be anchored to the platform as indicated at 22. Said aprons are preferably of rubber, which is immune to the acid solution employed for removing spray sediment but other material of equal capacity and characteristics may be employed if the material is flexible. In the most improved form of the invention, said aprons 21 are slit to form, for each apron, a series of wiping ribbons 23, the length of which is clearly shown in Fig. 2. Thus, the upper unslit or web portions of the aprons, afford stiffening sections that to some extent function to control the ribbons.

The proportions are such that the lower ends of the wiping ribbons 23, as shown, extend below the surface of the liquid level to a depth almost equal to the diameter of a relatively large size apple and hence movement of said ribbons in the liquid would cause a gentle trailing of the lower ends over and abreast of buoyant integers in the liquid. This trailing wiping engagement of the lower ends of the ribbons 23 would additionally spin and turn the floating integers against other ribbons, it being understood that the immersed ends of the ribbons intermingle with the integers in the liquid.

It will also be understood that on movement of the ribbons a series thereof may impose themselves on edible integers causing the latter to descend in the liquid and such movement will also add to the effectiveness of the wiping action on the moistened foreign matter.

In the preferred construction, I impart reciprocating movement to the ribbons 23 at a relatively rapid rate of speed. As shown, a connecting rod 24 has its forward or lower end suitably connected, as by a pivot 25, to the carriage. The remaining end is pivoted at 26 to a crank 27, that is mounted on a shaft 28. Said shaft 28, is shown journalled in bearings 29, mounted on a portion 30, of the machine. A pulley and belt 31 and 32, suitably driven, may serve to impart rotary motion to shaft 28.

With a current or other propulsion of buoyant edibles, as will be later described, the device of my invention would be efficiently operative with the above described wiping means, more especially where the foreign matter to be removed consisted of soil on the surface of the edibles.

However, on semi-buoyant edibles and those which are very sluggishly buoyant, and more especially where the foreign matter consists of spray sediment, I prefer to employ the additional mechanism which I am now about to describe.

Subjacent the edibles I provide wiping means which is movable and which supports the edibles, if necessary, against descent too far in the liquid, the two sets of wiping means, one above and one below the edibles, serving to confine the latter to substantially a given depth position.

As shown, the subjacent wiping means includes an endless carrier which may comprise chains 33 trained over sprocket wheels 34 that are mounted on shafts 35, suitably journalled in the side walls 2 of the tank. Between these chains are mounted bars 36 which as shown in Fig. 2, extend across the tank and which as will be seen in Fig. 1, are spaced slightly apart from each other. On each bar is shown mounted a plurality, preferably two, supporting wipers. These may be formed by taking a strip of inner tube tires and doubling them at 37, where they are suitably anchored to the bar, the free portions 38 extending upright as shown. Thus, the lower as well as the upper wipers are flexible. If desired, these strips may be slit, as shown in Fig. 2, although this is not essential. Better results can be had in practice by leaving the strips unslit as a slightly stiffer wiper results, and this is desirable for the supporting wipers, irrespective of the material employed. Motion is suitably imparted to the subjacent carrier to cause the upper lap to travel to the right of Fig. 1.

It is a feature of the invention to make the wiping carrier perform additional functions and I have provided the same with what may be termed dividing bars 39 which are mounted on outer portions of the chains 33 and extend across the tank as shown in Fig. 2. Each bar 39 has a flexible terminal edge, like the incline 8, formed by a strip of rubber or other suitable material secured to the sides as at 40. The bight of the material, as indicated at 41, extends beyond the outer edge 42, to form a collapsible terminal edge. These dividing or separating bars are herein shown spaced apart a distance to afford room for four rows of integers on the upper lap, between each pair of said bars. This makes for orderly handling of the integers and hence greatly increases the capacity as compared to indiscriminate disposition of the integers.

It will be seen from Fig. 1, that these bars 39 are high enough to extend above the lower supporting wipers and into contact with the lower ends of the wiping ribbons 23. However, they do not extend to the liquid level A.

These bars 39 also perform the valuable function of creating an endless current of the liquid with the surface flow directed toward the right of Fig. 1. This current will be a relatively gentle current as the carrier is operated at a very greatly reduced speed with respect to the speed of operation of the apron carriage 16. However, it will be clear that a very positive current is established by reason of the breadth and height of the bars 39, and the additional fact that these bars travel closely abreast of the bottom wall 1, of the tank.

Should any buoyantly sluggish integers descend to the left of the carrier, below incline 8, the bars 39 would pick up and restore such integers to their proper position between the wiping devices and it will be noted that the collapsible terminal edges 10 and 41 make it possible for the bars 39 to pass the incline 8, with actual contact. Such defective sinking action could not happen with fully buoyant integers such as apples, and hence, the restoration just described, would be useful mostly with other than buoyant integers.

I will next described an improved transfer device whereby the integers may be transferred from the subjacent wiping means upwardly toward and into an ejecting device.

As shown, said transfer and elevating device consists of base board 43 of a width clearly shown in Fig. 1, and of a length illustrated in Fig. 4. The rear edge of said board is mounted on a pivot rod 44, suitably journalled in the sides 2, of the tank to permit the board to bodily swing upwardly or downwardly from the position shown in Fig. 1. Projecting upwardly from the upper face of said board are a plurality of rows of wipers 45, similar to the wipers 38. The board is normally held yieldingly in the position shown in Fig. 1, by a pendulum 46, which may be secured to said board in any desired manner and which permits the board 43 to be swung downwardly in a manner to be presently described. A special recess is provided at 47, Fig. 3, to receive the pendulum when the latter swings to the right of Fig. 1.

I will next describe my improved ejector mechanism which functions to eject the integers from the tank into whatever further treating means is employed, such as a rinsing tank, not shown.

My ejecting device, as shown, comprises a series of upright spacing boards 48 suitably and rigidly secured in the tank in the position shown in Figs. 1 and 3. These boards are shown in spaced relation. The front edges 49 are closely disposed to the right of the transfer device and a receiving portion 50 is provided to receive the integers from said transfer device. From the receiving portion, the upper edges curve upwardly above the liquid level A, as indicated at 51 and from 52, which is the end of the curved portion, said edges slant downwardly as shown at 53, so that the integers will roll off from said slanting edges through an opening 54, in wall 4, out of the tank at a point above the liquid level A.

I will next describe the active portion of the ejecting device.

A shaft 55, suitably journalled in walls 2 of the tank, and which may be operated from a pulley 56, extends through openings 57 in the boards 48. On this shaft 55 is mounted a series of discs 58, which may or not be larger in diameter than the openings 57, and which are singly disposed between the boards 48, as shown, in a manner to be freely revolved by said shaft 55. Each disc is shown provided with four ejecting fingers 59 and the discs are located so that all the fingers of all the discs will be in alinement. The shaft 55 is located so that the fingers will ascend upwardly from below the receiving edges 50, lifting the integers in a clockwise direction, viewing Fig. 1, until the integers reach the high or apex point 52, whereupon, the fingers will retract downwardly between the boards 48, due to the eccentricity of the shaft 55 with respect to the center from which the curved edges 51 are struck. In any event, by the time the rows of integers reach the apex 52, they will be free to descend by gravity down the incline 53, which they will do in advance of the fingers.

While the operation may be clear from the foregoing, I will recapitulate the same in general terms to facilitate a complete understanding.

Assuming that the device is used for removing soil and other foreign matter from vegetables, the tank will be provided with a supply of water to the level indicated. Of course the water will soften such foreign matter and the rapid oscillation of the ribbons 23, together with the relatively slowly moving wipers 38 will cause a rapid turning of the integers against said ribbons and wipers such as will render the integers free from dirt.

As the nearest bar 39 makes the turn about the right hand bight of the carrier, it will engage the transfer board and lower the same against the action of pendulum 46 but just as soon as the bar has released the transfer device, the latter will be restored to the position shown. As the following rows emerge from the carrier, they will be advanced, not only by the surface current, but by succeeding rows of integers, to the right along and in engagement with wipers 45, until they reach the receiving portion 50, of the ejector device. The fingers 59 will elevate successive rows of integers upwardly and onto the downward incline 53, whereupon they will be discharged from the tank by gravity.

Assuming that the device is used for removing spray sediment from fruit, the delivery by rows, into the tank, and the successive wiping action will be substantially the same as just described in washing vegetables. However, the more buoyant fruit lends itself more readily to a more necessary and intensive coaction with the wiping ribbons. Apples, for instance, which are substantially fully buoyant, will expose portions of their areas above the surface and as the ribbons 23 are rapidly reciprocated, they will, by their mere weight, lower the apples as they turn and spin the same, and then as the apples are freed, they will again ascend to the surface in intermingled relation with the thickly disposed mass of ribbons. As the apples descend, they will be brought into wiping contact with the supporting wipers 38, which will additionally function to remove the softened spray sediment due to the penetration thereof by the acid solution. In practice, I have so completely and quickly removed this sediment that I believe penetration is greatly aided by the successive wiping of the apples by the superposed wiping devices.

It is the function of the bars or partitions 39, or one part of their function, to maintain the edibles in a generally orderly disposition which is preferably in rows. However, this function is not intended to be performed to any great nicety but only in a general way, as in practice, the rows would not be in actual engagement with each other, as rows, as it would not be practical. Therefore, the edibles have considerable freedom for individual movement in the absence of restraint. Hence, I will term the buoyant condition as one that is full floating, in the sense that the edibles in their various movements upwardly and downwardly, as well as laterally, are free, individually, to assume any indiscriminate position into which they may be thrust by the wiping device or devices.

It will thus be seen that while I apply wiping action to the edibles above and below the same, I also advance the edibles and the latter are always free floating integers.

It is believed that my improved method and mechanism will be fully understood from the foregoing description, and while I have herein shown and described one specific form of my invention, I do not wish to be limited thereto except for such limitations as the claims may import.

I claim:

1. In a fruit treating mechanism, a tank adapted to contain a solvent solution for spray sediment to be removed from the fruit, means for delivering fruit to said solution in rows, a wiping means superimposed on the buoyant fruit in said solution, an endless carrier below the buoyant fruit and having supporting wipers, and said carrier having dividing bars maintaining the fruit in rows and initiating an endless current of the solution.

2. In a fruit treating mechanism, a tank adapted to contain a solvent solution for removal of the spray sediment on the fruit therein. Wiping means engaging the upper portion of the floating fruit, a carrier below the floating fruit having wiping means, a tiltable transfer device for taking the fruit from said carrier and having wiping means thereon, and said carrier having partition bars for maintaining the floating fruit in orderly formation and adapted to engage and tilt said transfer device while advancing the fruit theretoward.

3. In a fruit treating mechanism, a tank adapted to contain a solvent solution for removal of the spray sediment from the fruit therein, means including an endless wiping carrier for wiping the floating fruit and moving the latter toward the ejecting end of the tank, said carrier having projecting partition bars for maintaining the fruit in row formation, a transfer board for receiving the floating fruit from the end of the carrier and being tiltable to permit passage of said partition bars, and means for restoring said transfer board to a normal position after passage of said bars.

4. In a fruit treating mechanism, a tank adapted to contain a solvent solution for the spray sediment to be removed from the fruit and buoyantly supporting the fruit in said tank in a single layer with the fruit free to roll, sink, rise and move laterally in indiscriminate freedom, a thickly disposed series of elongated and inherently limp wiping ribbons, means for supporting said ribbons above the solution with their lower ends immersed among the fruit integers below the solution level, means for rapidly reciprocating said first named means to cause the limp ends to engage and pile upon and against the floating fruit integers and by weight of said ends cause said integers to roll, sink, rise and move laterally of each other indiscriminately in the solution to wipe off the dissolved sediment from said integers, and means below the solution surface for positively causing the floating integers to advance relatively slowly in one direction.

5. In a fruit treating mechanism for buoyant and semi-buoyant fruit, a tank adapted to contain a solvent solution for the spray sediment to be removed from the fruit and buoyantly supporting the fruit to permit the latter to roll, sink, rise and move laterally in indiscriminate freedom in said solution, a thickly disposed series of elongated and inherently limp wiping ribbons, a carrier for pendently supporting said ribbons with their lower free ends dipping into said solution, means for reciprocating said carrier to cause the limp ends to engage and pile upon and against the integers and by weight of said ends cause said integers to roll, sink and permit them to rise and move laterally of each other indiscriminately in said solution to wipe off the dissolved sediment from said integers, and flexible wiping means below said integers sustaining the semi-buoyant integers from sinking beyond a predetermined extent and wiping any of the integers that sink within its range.

6. In a fruit treating mechanism for full buoyant and semi-buoyant fruit integers, a tank adapted to contain a solvent solution for the spray sediment to be removed from the fruit and buoyantly supporting the latter to roll, sink, rise and move laterally in indiscriminate freedom in said solution, a thickly disposed series of inherently limp wiping ribbons, a carrier pendently supporting said ribbons with their lower ends dipping into said solution, means for reciprocating said carrier to cause the said limp ends to pile upon and against said integers and by weight of said ends cause said integers to roll, sink and move laterally and release said integers to rise to wipe off the dissolved sediment from said integers, wiping means below the surface of said solution preventing said integers from sinking too far and engaging the bobbing integers to wipe the latter, and means below the solution level for positively causing said integers to move constantly in one direction and thereby increasing the efficiency of said reciprocating wiping ribbons.

EDWARD A. WHITE.